United States Patent
Moore et al.

(10) Patent No.: US 9,001,505 B2
(45) Date of Patent: Apr. 7, 2015

(54) LOW COST RUGGED PORTABLE DATA STORAGE DEVICE AND DOCKING STATION

(75) Inventors: Robby Jay Moore, Auburn, CA (US); Brooks Ira Davis, Rescue, CA (US)

(73) Assignee: ioSafe, Inc., Auburn, CA (US)

( * ) Notice: Subject to any disclaimer, the term of this patent is extended or adjusted under 35 U.S.C. 154(b) by 974 days.

(21) Appl. No.: 13/068,718

(22) Filed: May 18, 2011

(65) Prior Publication Data

US 2011/0286173 A1 Nov. 24, 2011

Related U.S. Application Data

(60) Provisional application No. 61/395,966, filed on May 20, 2010, provisional application No. 61/460,536, filed on Jan. 4, 2011.

(51) Int. Cl.

| | | |
|---|---|---|
| H05K 7/00 | (2006.01) | |
| G06F 1/18 | (2006.01) | |
| G11B 33/02 | (2006.01) | |
| G11B 33/08 | (2006.01) | |
| G11B 33/12 | (2006.01) | |
| G11B 33/14 | (2006.01) | |

(52) U.S. Cl.
CPC .............. *G06F 1/187* (2013.01); *G11B 33/025* (2013.01); *G11B 33/08* (2013.01); *G11B 33/122* (2013.01); *G11B 33/1406* (2013.01); *G11B 33/1453* (2013.01)

(58) Field of Classification Search
USPC ............. 361/679.01, 679.02, 679.09, 679.26, 361/679.55, 730, 747, 752, 796, 679.33
See application file for complete search history.

(56) References Cited

U.S. PATENT DOCUMENTS

2007/0061598 A1 * 3/2007 Bitton et al. .................. 713/194

* cited by examiner

*Primary Examiner* — Robert J Hoffberg
*Assistant Examiner* — Hung Dang
(74) *Attorney, Agent, or Firm* — Bruce H Johnsonbaugh

(57) ABSTRACT

A low cost, water resistant, rugged and enclosed portable digital data storage device is provided. A two piece enclosure includes a monolithic housing and a cover, both preferably metallic. A passageway is formed in a side wall of the enclosure for plugging an external power and data line into an internal connector which extends into or adjacent the passageway. A liquid water resistant epoxy is applied over the internal connector and adjacent the passageway prior to applying the cover. The result is a low cost, water resistant enclosure with water resistant passageway for power and data lines that remains water resistant whether the external power and data lines are connected to the digital data storage device or not. A fire resistant docking station is also provided, into which the portable data storage device may be easily connected to a primary computer for transferring data.

3 Claims, 6 Drawing Sheets

LOW COST RUGGED PORTABLE DATA STORAGE DEVICE AND DOCKING STATION

CROSS REFERENCE TO RELATED APPLICATION

This application claims the benefit of and priority from U.S. provisional application Ser. No. 61/395,966 filed May 20, 2010 and Ser. No. 61/460,536 filed Jan. 4, 2011.

BACKGROUND

The present invention pertains in general to systems for preventing the loss of digital data. More particularly, the invention in one embodiment, provides a low cost, rugged, portable storage device. In another embodiment the invention provides a docking station for transferring data from a primary computer to a portable storage device wherein the docking station is resistant to loss of data caused by fire or water. The portable storage device may be used together with the docking station for safely transferring data from a primary computer.

Portable data storage devices, like small portable hard disk drives, solid state drives or USB flash drives are very popular and conveniently move vast amounts of data from location to location. Portable data storage devices are also often used to backup a primary computer's data by using either the popular Universal Serial Bus (USB), eSATA, Firewire, Thunderbolt interface or any interface that allows data to be transferred from one system to the next system. The portable device is often part of a disaster recovery strategy and moved offsite to protect personal or critical business data against disasters such as fires or floods in the primary computer location. Likewise, using portable data storage may be the only viable data storage option if one happens to be creating digital data away from home or the office such as digital photography while hiking in the mountains or on a work trip while using a laptop.

Many critical vulnerabilities to physical disasters exist while traveling with a portable data device such as exposure to water, sand, mud, physical shock from drops, high altitude hard disk drive head crashes due to lack of atmospheric pressure and crush forces which can distort the data storage device housing causing data loss. Protection from some of the aforementioned elements has traditionally been reserved for extremely expensive data storage devices such as aircraft flight data recorders and military applications but typically not available at lower consumer prices due to multiple expensive components. The present invention overcomes the above problems by providing a low cost, disaster resistant, portable data storage device.

A common approach used in the prior art focuses strictly on physical shock protection as mechanical hard drives are especially susceptible to drops and falls when handled. Another common approach used in prior art designs to provide water resistance to such portable devices is to include removable caps or plugs. Those caps or plugs must be removed to activate the portable device. While the portable device is actuated, it is vulnerable to water damage. More importantly, the caps or plugs must be reinserted after shutting down the portable device. The caps or plugs are easily forgotten, misplaced or damaged, in which case the portable device is immediately vulnerable to water damage. The present invention overcomes this problem as described below.

During the time that a data storage device is connected to a host computer, typically both are vulnerable to natural disasters such as fire, flood and the like. The present invention addresses that problem.

Portable data storage devices are also often used to backup a primary computer's data. A docking station for the portable device can add extra convenience for the user of the device by creating a dedicated connection to the primary computer and to hold the portable device while docked onto the docking station.

A critical vulnerability to natural disaster exists during the time the portable backup device is located next to the primary computer to be backed up. Until this portable device is physically relocated away from the primary computer, a natural disaster can destroy both the primary device and the portable device resulting in data loss.

All previous designs known to the applicants have resulted in a relatively heavy device to be relocated due to the typical weight of water based fireproof insulation such as gypsum or Portland cement. Reducing the amount of insulation can reduce weight but this will also result in decreased fire protection.

BRIEF SUMMARY OF INVENTION

The present invention represents a significant advance over the prior art because for the first time, a low cost portable data storage device can be made highly ruggedized for portable use yet cost 50% less than existing designs by utilizing design concepts taught in this disclosure. The portable data storage device disclosed below is water resistant, crush resistant and impact shock resistant, —all at a much lower cost than competitive devices. In addition, a major weakness with all waterproof design construction known to applicants is that special gasketed connectors or waterproof caps are typically required to keep any liquids from damaging the data storage device, as described above. For the first time, a ruggedized portable data storage device can be used with any industry standard low cost consumer data connector yet protect the data storage device from liquid damage even during use, without the need for a waterproof cap, plug or special waterproof connectors. The present invention design construction also allows for low cost, printed circuit board components to be used in addition to the added benefit of being able to easily remove the internal data storage device, hard disk or solid state drive data module for quick disaster recovery and low cost, simple assembly. These results are obtained by applying an electronic potting compound or plastic resin to the printed circuit board and connector inside the enclosure and adjacent the passageway through which power and data lines pass through a wall of the enclosure. The design of the enclosure facilitates this technique during the assembly of the device.

The present invention also provides new critical features to improve portability of mobile data yet protect the data when the portable data storage device is docked to the primary computer. By incorporating a fireproof docking station with a waterproof, ruggedized data storage device, the portable data storage device may be easily removed from the fireproof docking station and carried to another facility. The portable data device is protected against water damage while in transport to the offsite location. Protection against fire is less critical while the portable data device is being transported. The portable data storage device can also include protection provisions for encryption, crush, shock and drop to further protect the portable device from damage. Elastomeric supports or bumpers can be added to either the outside or inside of the device to help protect shock-sensitive data media (like rotating mechanical hard drives) from damage.

Alternatively, for data that is created out in the field such as with a digital camera, digital video surveillance or created on a remotely located laptop computer, the waterproof data storage device can be used as a backup target and then be brought back to the primary docking station and docked into the fireproof docking station. The invention protects critical data from natural disaster even though the laptop, portable drive and primary computer all are located in the same immediate area!

Alternatively, the portable data storage device with fireproof dock could be mounted in a vehicle to create a disaster protected vehicle based storage device with an easy to remove, lightweight, waterproof portable data storage module.

A key feature of the docking aspect of the invention is that the user is not required to manually shut or open any doors during the docking and undocking of the portable data storage device from its fireproof docking station. This key feature allows the portable data storage device to be connected and disconnected in a matter of seconds as compared to opening and closing a standard fireproof safe which can take 10× longer (1000% increase in time required) yet provide a similar level of fire protection because the thickness of the fireproof docking station is not compromised in order to reduce weight. The fireproof docking station will sense the presence of high temperature fire and close automatically without any user intervention. Alternatively, the portable waterproof data storage device can retract back into the fireproof dock when the doors close. The retraction operation (not shown) could be initiated upon sensing a fire or upon using a simple ejection button (not shown) to initiate ejecting the portable drive from the fireproof dock 10. The fire protection of the previously exposed side of the fireproof dock can exist in many forms. A simple fireproof door, spring and meltable trigger can be used as shown in the prior art. An intumescent (expanding char or foam) could be used to also protect the previously exposed side of the data storage device. The opening could also be sized to prevent damaging heat from touching the exposed side but relying on the steam action from the fireproof insulation continuously outgassing to form a barrier against the fire (as disclosed in the prior art).

A multitude of cooling vent techniques could also be applied to improve cooling during normal operation yet allow for protection during a fire.

Another key feature of the invention is the waterproof barrier aspect of the design. The waterproof barrier is critical as almost all fires have a potential for water damage from fire hoses or fire sprinklers typically present in most commercial buildings. Allowing the waterproof barrier to dissipate heat is also a critical element of the design as previously disclosed in the prior art. The portable drive retains a reasonable level of physical protection if it remains waterproof and optionally crush, shock and drop proof. Moving data to and from a data center from vehicles subjects the data storage to the elements of rain and/or the possibility of getting dropped onto dirt, asphalt or cement.

The combination of the portability, disaster-proof features, docking speed and convenience of this invention creates a new category of highly ruggedized, fireproof, waterproof, secure, portable data storage devices for consumers and businesses alike. The data is fireproofed when risk of fire damage is the greatest (when docked to a primary computer), effectively reducing a vulnerability issue present with all existing portable data storage devices.

The primary object of the invention is to provide a low cost, ruggedized and portable data storage device which is water resistant, impact shock resistant and crush resistant.

Another object of the invention is to provide an improved method of assembling a low cost, water resistant portable data storage device.

A further object is to provide a fire resistant docking station temporarily connecting a primary computer to a portable data storage device to facilitate the transfer of data and to protect both the primary computer and the portable device from fire and water damage while they are docked together.

Further objects and advantages will become apparent from the following description and drawings.

DETAILED DESCRIPTION OF THE DRAWINGS

Figure 1:
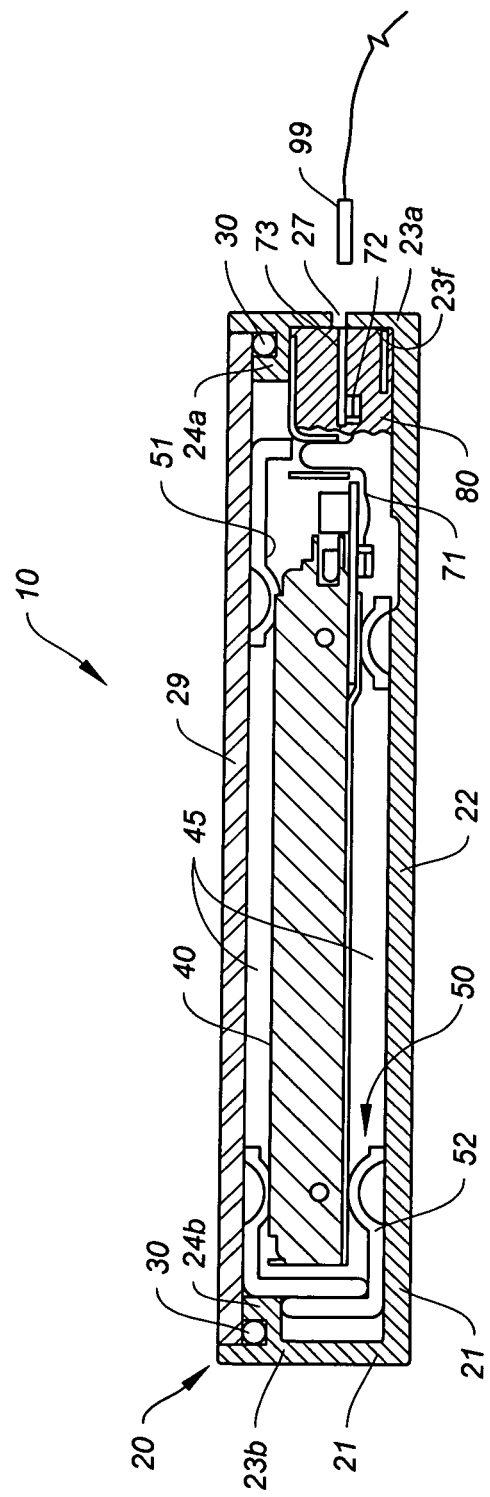
FIG. 1 is a sectional view of the portable data storage device.
Figure 2:
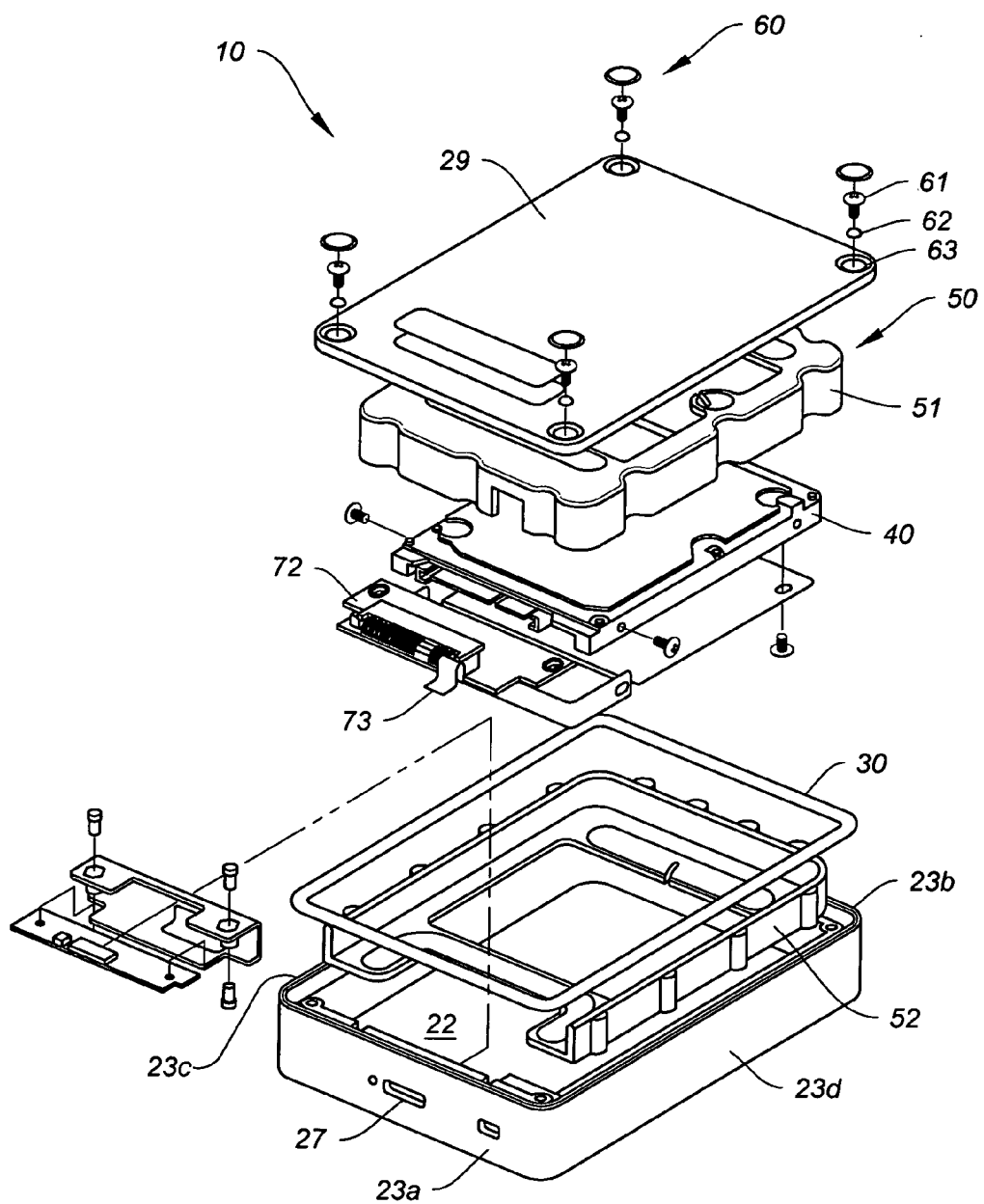
FIG. 2 is an exploded, perspective view of the device shown in FIG. 1.

As shown in FIGS. 1 and 2, a portable data storage device is shown generally as 10. The device 10 includes a two-piece enclosure 20 having a housing 21 and a cover 29. Housing 21 is preferably a monolithic, metallic structure having a floor 22 and walls 23a-23d including front wall 23a, rear wall 23b, and side walls 23c and 23d. Housing 21 is preferably forged or machined from a solid block of aluminum, steel or titanium for maximum crush resistance. Housing 21 can alternately be made of plastic. Housing 21 is preferably rectangular in shape. Walls 23a-23d preferably extend upwardly perpendicularly from floor 22 to cover 29. Each wall includes a lip 24a-24d formed near the top of each wall 23a-23d respectively. The lips 24a-24d form a flat surface against which cover 29 seats. Recesses 25a-25d are formed in lips 24a-24d respectively to receive a sealing gasket 30.

A water resistant seal between housing 21 and cover 29 is formed by sealing gasket 30, which may be a single piece as shown in FIG. 2 or may include several segments.

A digital data storage device 40 is shown in FIG. 1 positioned inside two piece enclosure 20.

A resilient impact shock absorber means 50 includes upper and lower elastomeric suspension segments 51 and 52, respectively. The elastomeric suspension segments 51 and 52 are positioned adjacent the digital data storage device 40 and suspend the device 40 between the floor 22, walls 23a-23d and cover 29 of enclosure 20. This suspension provides impact shock resistance for the data storage device 40.

Connecting means 60 are provided for joining housing 20 and cover 29, and include screws 61, water resistant gaskets 62 and holes formed in cover 29. Screws 61 are anchored in lips 24a-24d of walls 23a-23d and draw cover 29 downwardly against gasket 30 to form a water resistant seal between housing 21 and cover 29.

Internal power and data connections shown generally as 70 carry power and data between portable data storage device 40 and passageway 27 formed in front wall 23a. The power and data connections 70 include a cable connection or flexible circuit 71 connected to storage device 40, and a printed circuit board 72. Printed circuit board 72 has a receptacle or connector 73 that is positioned adjacent passageway 27 in front wall 23a. An external power and data connection 99 is plugged into receptacle 73 to transfer data, provide power and for other purposes.

A water resistant sealing means 80 preferably comprises a waterproof epoxy potting compound or resin molded to encapsulate the circuit board and seal the passageway 27. The compound is placed inside housing 21 and adjacent passageway 27 as shown and described in detail below. The purpose of sealing means 80 is to prevent water from passing through passageway 27 and entering the chamber 45 which surrounds data storage device 40. The data storage device 40 is not completely encapsulated with the epoxy potting compound 80 to lower assembly costs by 50% and improve disaster recovery speeds by 75% over the prior art.

Figure 3:
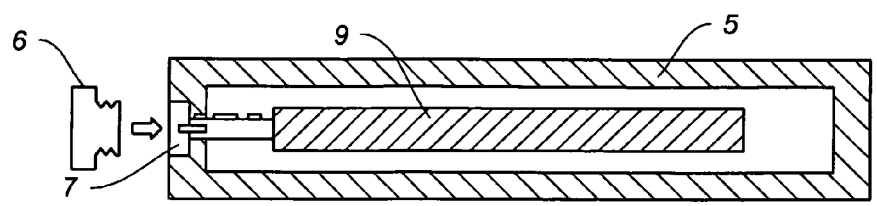
FIG. 3 is a sketch illustrating the "concept" of a waterproof cap utilized in prior art devices.
Figure 4:
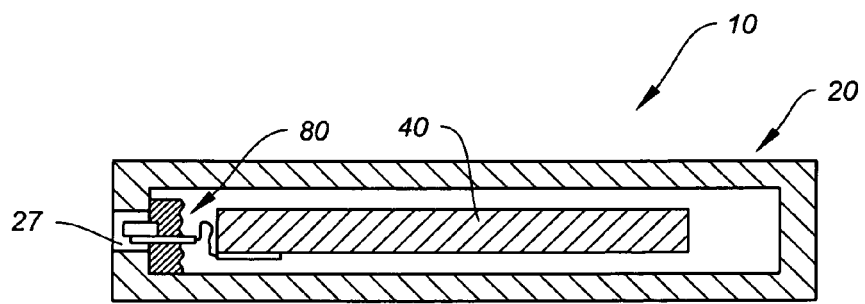
FIG. 4 is a sketch illustrating the "concept" of the technique utilized in the present invention to provide water-resistant protection for the power and data lines.

FIGS. 3 and 4 illustrate the difference in "concept" of the technique for making a typical prior art enclosure 5 in FIG. 3 water resistant as compared with the technique used with the enclosure 10 of the present invention shown in FIG. 4. As shown in FIG. 3, the prior art enclosure 5 relies upon a waterproof cap 6 which must be inserted into passageway 7. As shown in FIG. 3, while the cap 6 is removed, or lost or damaged, water can enter passageway 7 and reach the data storage device 9. As shown in FIG. 4 and described above, the use of a waterproof epoxy potting compound forms a water-resistant seal 80 for passageway 27. No removable caps are required and the seal remains intact whether the data storage device is connected to external data and power lines or not.

Figure 5:
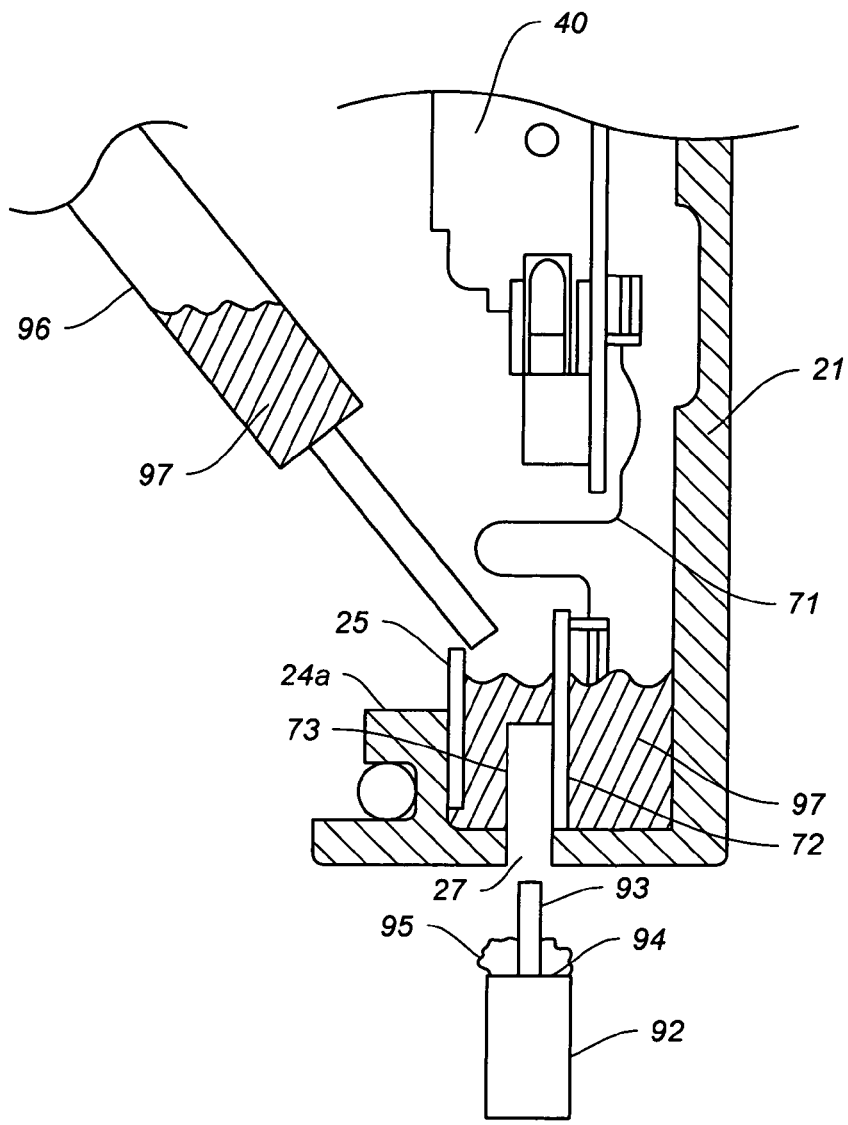
FIG. 5 is a schematic illustration showing how the water resistant seal is applied during assembly of the portable storage device.

It is significant to note that water resistant sealing means 80 may be inserted just prior to cover 29 being attached to housing 21. As shown in FIG. 5, sealing means 80 is applied or inserted as the penultimate step in assembly of the portable storage device 10. The epoxy compound or molded resin utilized covers printed circuit board 72 and the outer surface of connector or receptacle 73. It also covers a portion of the inside surface 23f of front wall 23a adjacent passageway 27. Sealing means 80 effectively prevents intrusion of water through passageway 27 into enclosure 20 and chamber 45, regardless of whether the data storage device 40 is connected to external power and data lines or not. The epoxy compound or resin used can be prevented from fouling the contacts of the power and data connection receptacle 73 by a variety of ways including a washable grease (not shown) or close fitting plug which mimics the shape of the external connection 99. This technique enables the use of standard low cost connection plugs reducing manufacturing costs by up to 25%.

FIG. 5 shows in detail how the water resistant epoxy is applied. The housing 21 is rotated so that passageway 27 is extending downwardly. A plug 92 has an upwardly extending tip 93 and a shoulder 94. Shoulder 94 carries a grease 95 that is temporarily inserted upwardly into passageway 27 to prevent epoxy from either fouling connector 73, or draining through passageway 27. An epoxy dispenser 96 is used to dispense liquid epoxy 97 around printed circuit board 72 and power and data connector 73. A barrier 25 is connected to lip 24a to prevent epoxy 97 from spilling over lip 24a. Barrier 25 is not visible in FIG. 1. To keep the epoxy from leaking through the passageway prior to the epoxy hardening, the plug 92 is required to be inserted into the data connector or receptacle 73. A gasket, non-conductive silicon grease such as Dow Corning DC4 or silicon sealant is used in conjunction with the plug to keep the electrical contacts from being coated with the epoxy potting compound. The gasket, grease or sealant also keeps the epoxy potting compound from flowing out the passageway.

A plug can be used in any passageway formed in the waterproof housing such as any data connection or security slot such as a Kensington lock slot standard in the industry.

Alternatively, the epoxy potting compound can be preformed as an overmolded plastic resin such as Santoprene or silicon rubber shaped to fit in the epoxy potted area inside the waterproof housing.

It is important to note that the back of the data connector is completely immersed in the epoxy potting compound as this prevents any water, during the hard drive normal operation, from leaking through the internal passageway within the connector itself. The epoxy is allowed to harden and plug 92 is removed. The passageway 27 is now water resistant, as the hardened epoxy (or hardenable plastic resin) has covered the outer surface of power and data connector 73 and some or all of printed circuit board 72.

The combination of the water resistant sealing means 80 and water resistant seal 30 provides a hermetic seal for data storage device 40. Sea level or low elevational atmospheric pressures are maintained even if the device 40 is in an airplane, on a mountain top or other high altitudes.

Figure 6:
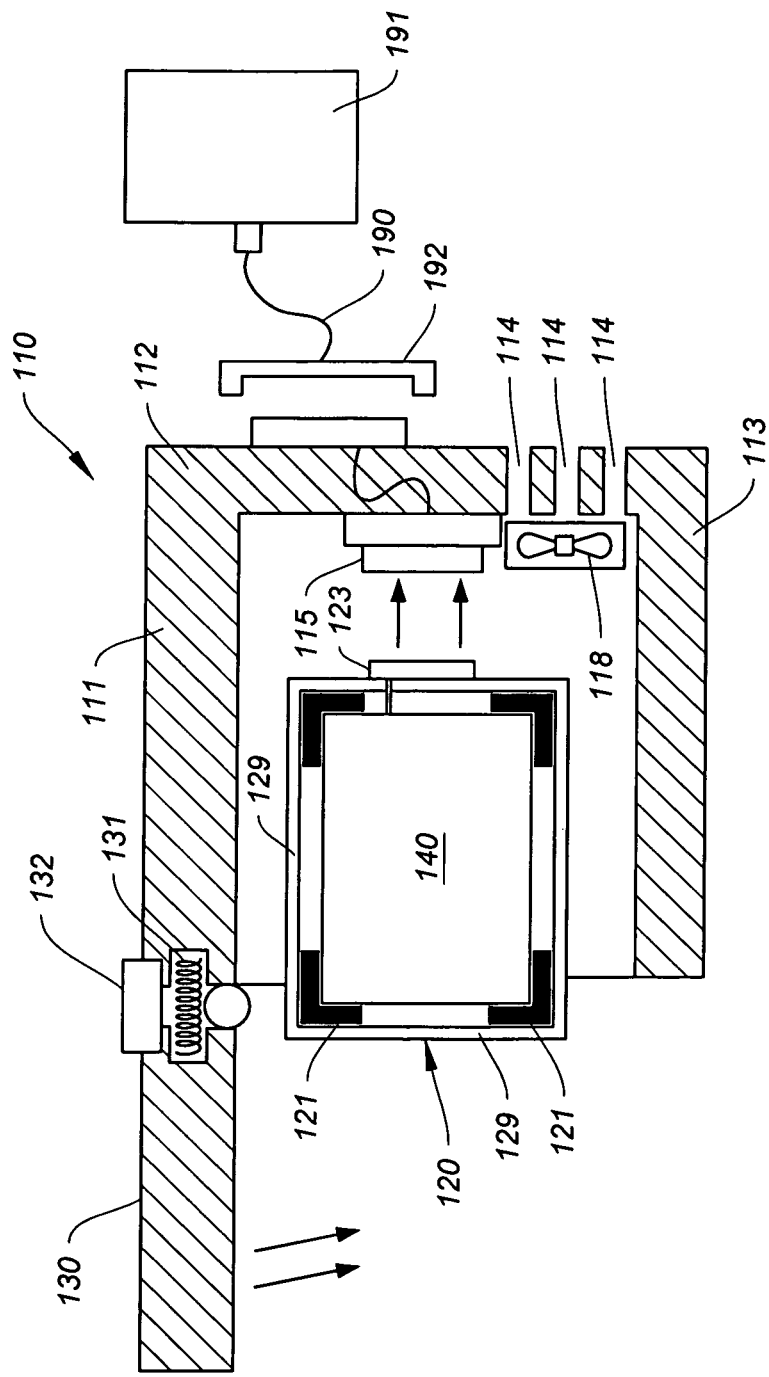
FIG. 6 is a schematic illustration of a docking station in its open position.

FIG. 6 is a schematic illustration, not to scale, of a fireproof docking station 110 with a portable data storage device 140 in enclosure 120 about to be connected to docking station 110. The purpose of docking station 110 is to connect the portable device 140 to primary computer 191 and transfer data from primary computer 191 to portable device 140 and vice versa. Movable door 130 is designed to remain open to allow easy, one handed docking and undocking of portable device 140 during normal use. While docked, fire protection is enabled by meltable trigger (or fire sensing means) 132 and spring closure mechanism 131 to automatically sense a fire and close the door 130. In its closed position (not shown for clarity) door 130 rotates downwardly and butts against lower wall 113 to fully enclose device 140. The door, trigger, spring combination can be effectively accomplished with solenoids, intumescent doors and/or tuned exhaust port designs as disclosed in the prior art (U.S. Pat. Nos. 7,211,742; 7,291,784; 7,843,689; 7,855,880; and 7,880,097). The door 130 can also be designed as one or two sliding doors (not shown) instead of a hinged door as shown. The important aspect of the door design is not the exact construction of the door which is covered in detail in the prior art (e.g. hinged doors, dual sliding doors, virtual steam out-gassing doors, intumescent doors, etc.) but rather that the door remains an unobtrusive element that the user does not have to interact with during normal, room temperature, docking and undocking operations. A common fire safe with a hinged door requires that the user opens and then remembers to shut the door in order to protect the contents within.

The fireproof dock 110 can be a metal or plastic enclosure having walls 111-113 filled with fire resistant or fireproof material, such as gypsum or concrete. Enclosure 110 may have one or more walls such as wall 112 in which ventilation openings 114 may be formed along with fan 118 for providing cooling air for the hard drive or other storage device 140. Interior walls of fireproof dock 110 may have rails, slides or features (not shown) to allow for sliding engagement with waterproof portable drive 140 to improve docking of data connector 123 on device 140 with docking port 115; connector 123 is removably attachable to port 115.

Alternatively, the fireproof dock 110 could be substituted with a non-fireproof dock (not shown) to save money. The device would retain the waterproof, crush, shock and portability described herein without the fireproof protection as a feature of the dock. If the dock is designed to not resist fires, the door 130 and associated hinge, spring 131 and trigger 132, can all be omitted to save even more money on the total cost of goods of this device. The data storage device 140 would still operate as shown in FIG. 6 by connecting to any computer 191 via an adapter cable 190 and connector 192.

Optional elastomeric bumpers 121 can be incorporated to improve shock resistance for shock sensitive data storage devices such as mechanical hard disk drives. Solid state drives are less susceptible to shock and therefore may not be in need of any elastomeric features. Flexible bumpers can exist on the inner (as shown) or outer surfaces (not shown) of the water barrier 129.

Figure 7:
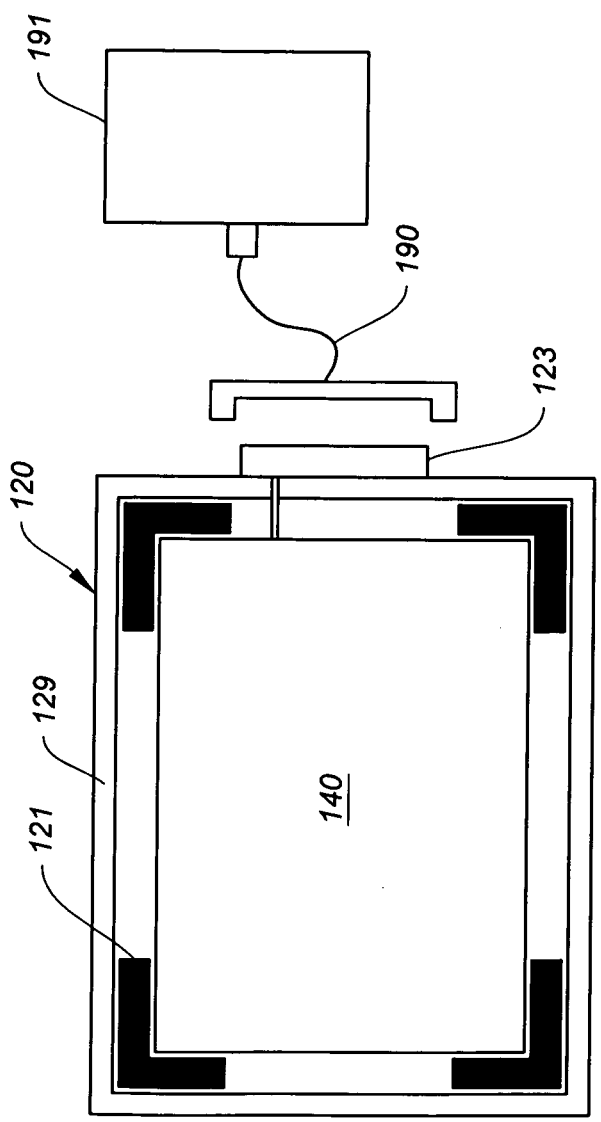
FIG. 7 is a schematic drawing of the portable data storage device being connected to a computer or laptop with an adapter cable being used without the fireproof docking station.

FIG. 7 is a schematic drawing, not to scale of the portable data storage device 140 being connected to a computer or laptop 191 with an adapter cable 190. A key feature of this variation is that the portable data storage device can be used with and without the fireproof docking station.

The waterproof barrier 129 could also be made of a high strength metal or composite to improve crush resistance to building collapse or to vehicle damage from crashes or being run over. The elastomeric bumpers 121 can be optionally added externally to protect against shock, drops or scratches.

It is also significant to note that the fan 113 illustrated in the embodiment of FIG. 6 is optional and that alternatives to the ventilation opening 114 may be provided in the front, rear, top, bottom or side walls (not shown) to allow cooling. The entire docking station 110 may also be installed within a typical computer chassis and take advantage of forced air flow already present in the computer chassis in which this device is mounted within (not shown). Cooling air flowing around the outside of enclosure 120 may also provide sufficient cooling from additional fans present in computer chassis (not shown) in which this device is mounted. Cooling air from simply leaving the door 130 open during normal operation would also be advantageous. Only with the addition of the portable, dockable, waterproof data storage device 140 shown in FIG. 6 with docking station 110 is the maximum convenience and protection level reached for this invention.

The door 130 could optionally be closed (not shown) and locked for theft purposes to prevent theft of the data storage device 140. With the door shut, requirements for heat dissipation and water protection would be satisfied with features described in the prior art. Alternatively, a separate locking mechanism (not shown) can prevent unauthorized users from disconnecting the device. The locking mechanism could consist of a simple keyed latch, biometrically triggered latch or RFID triggered latch to prevent unauthorized removal.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments and with various modifications suited to the particular use contemplated.

What is claimed is:

1. A low cost, rugged and enclosed portable digital data storage device comprising:
   a two piece enclosure including a housing having a floor and side walls, and a cover,
   said housing being a monolithic piece
   a water resistant seal between said housing and said cover
   connecting means for joining said housing and said cover of said enclosure,
   a digital data storage device positioned inside said two piece enclosure,
   a passageway formed in a side wall of said housing
   an internal data and power connection for said digital data storage device extending from said device to said passageway for connection to external power and data lines, and
   water resistant sealing means within said housing and adjacent said passageway for preventing intrusion of water into said enclosure through said passageway regardless of whether said digital data storage device is connected to said external data and power lines or not
   wherein said water resistant seal between said housing and said cover, together with said water resistant sealing means within said enclosure and adjacent said single passageway forms a hermetic seal for said digital data storage means, whereby sea level or low elevational atmospheric pressures are maintained even if said device is in an airplane or on a mountain top.

2. The device of claim 1 further comprising:
   a fire resistant docking station for connecting said portable digital data storage device to a primary computer to transfer data from said primary computer to said portable digital data storage device, comprising:
   a primary computer
   a fire resistant enclosure having fire resistant walls and a fire resistant movable door,
   a docking port carried by one of said walls, said docking port being connected to said primary computer,
   wherein said digital data storage device has a data connection removably attachable to said docking port for transferring data from said primary computer to said portable digital data storage device,
   said walls of said fire resistant enclosure forming a chamber into which said portable digital data storage device fits,
   said movable door being movable between an open position in which said data connection of said portable digital data storage device may be readily connected to said docking port, and a closed position in which said movable door forms a fire resistant enclosure surrounding said portable digital data storage device with said fire resistant walls,
   fire sensing means for sensing the presence of fire, and
   door closure means for closing said movable door in response to the sensing of fire by said fire sensing means.

3. A fire resistant docking station for connecting a portable digital data storage device to a primary computer to transfer data from said primary computer to said portable digital data storage device, comprising:
   a primary computer
   a fire resistant enclosure having fire resistant walls and a fire resistant movable door,
   a docking port carried by one of said walls, said docking port being connected to said primary computer,
   wherein said digital data storage device has a data connection removably attachable to said docking port for transferring data from said primary computer to said portable digital data storage device, said walls of said fire resistant enclosure forming a chamber into which said portable digital data storage device fits, said movable door being movable between an open position in which said data connection of said portable digital data storage device may be readily connected to said docking port, and a closed position in which said movable door forms a fire resistant enclosure surrounding said portable digital data storage device with said fire resistant walls, fire sensing means for sensing the presence of fire, and door closure means for closing said movable door in response to the sensing of fire by said fire sensing means.

\* \* \* \* \*